Sept. 25, 1951　　DE VER K. WARNER ET AL　　2,569,031
CAMERA DRIVE MECHANISM
Filed July 18, 1949　　2 Sheets-Sheet 1
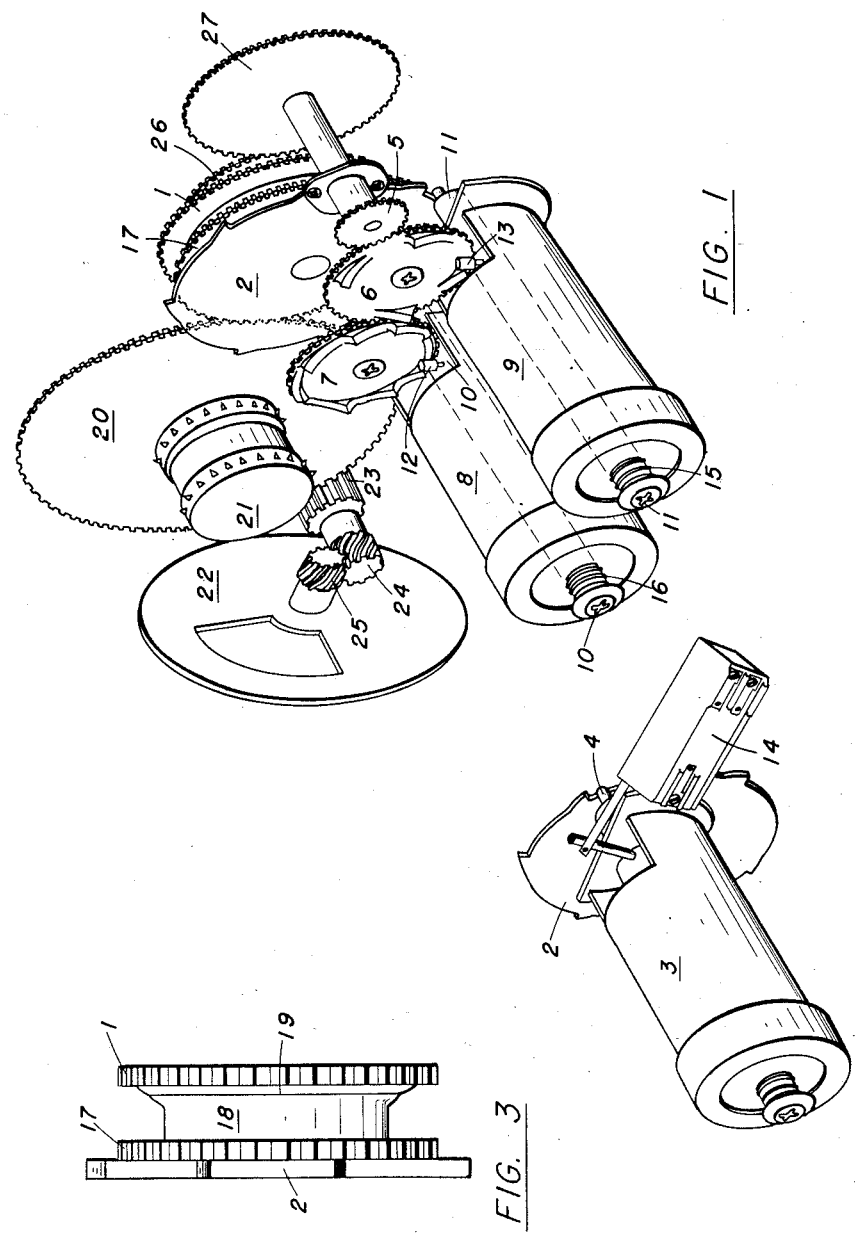
INVENTORS
DE VER K. WARNER
DWIGHT R. MARTIN
ERNEST L. BELLOWS
BY William R. Lane
ATTORNEY Patented Sept. 25, 1951

2,569,031

UNITED STATES PATENT OFFICE 2,569,031

CAMERA DRIVE MECHANISM

De Ver K. Warner and Dwight R. Martin, Los Angeles, and Ernest L. Bellows, Venice, Calif., assignors to North American Aviation, Inc.

Application July 18, 1949, Serial No. 105,374

2 Claims. (Cl. 88—18)

1

This invention pertains to continuous flight test data recording cameras and particularly to a movie camera adapted to record flight test data.

In the recording of flight test data it is necessary to take photographs of instruments and indicator panels in the aircraft. Some of the information gathered needs to be taken continuously while under other conditions it suffices to record the data at periodic or non-uniform intervals. A conventional movie camera would suffice for the purpose of making a continuous record of the readings of the indicator dials or other indicating devices in the aircraft. However, it is often desirable to take a picture of the control panel or the indicator dials only at preselected intervals or at a rate considerably reduced from the standard rate of operation of a movie camera, which is normally sixteen frames or pictures per second. While most movie cameras have provision for reduced rates of operation, such as at four or eight frames per second, such reduction has always entailed a proportionate decrease in shutter speed and consequent increase in exposure time. It has therefore been necessary to make a corresponding manual adjustment of the aperture or lens setting to compensate for the increased exposure time and thus avoid over-exposure of the film. Inasmuch as in testing modern high speed aircraft it is necessary that the camera be automatically and remotely operable, this adjustment is impracticable for the recording of flight test data. This invention contemplates a drive mechanism for any movie camera of the intermittent exposure type which is capable of varying the number of frames exposed per unit time without adjustment of the iris setting.

It is therefore an object of this invention to provide in an aircraft flight test data recording camera a drive mechanism adapted to operate the camera at a predeterminately variable rate but at constant iris setting.

It is a further object of this invention to provide a drive mechanism for a movie camera which is adapted to take either single or multiple exposures.

It is a further object of this invention to provide a drive mechanism for a movie camera which can be operated intermittently but at constant speed.

It is a further object of this invention to provide an electrically controlled drive mechanism for a movie camera to drive said movie camera either for single exposures or for multiple exposures with but a single lens setting.

2

Further objects of invention will become apparent from the following description taken in connection with the accompanying drawings, in which Fig. 1 is a partial isometric view of the invention;

Fig. 2 is an isometric view of an additional component of the invention;

Fig. 3 is a detailed view of the clutch member of the invention; and

Figure 4:
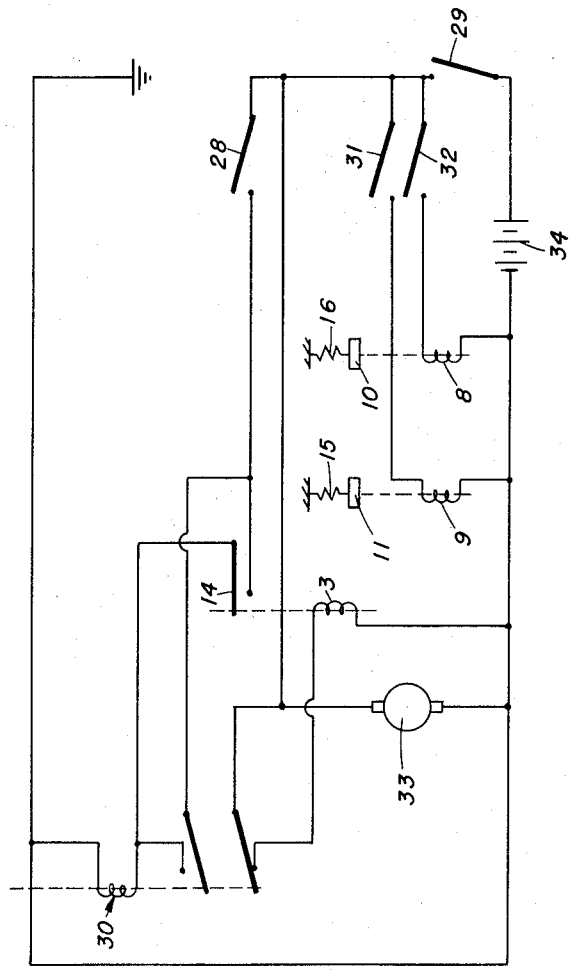
Fig. 4 is a circuit diagram of the device shown in Figs. 1, 2, and 3.

Referring to the figures there are shown the principal parts of the drive mechanism of this invention. Driving gear 1 is driven at constant speed by an electric motor (not shown). Driving gear 1 is coaxially friction connected to escapement wheel 2 having a plurality of teeth. A solenoid 3, shown separately in Fig. 2 for clarity, has a centrally located pin 4 which serves as an escapement pin in connection with escapement wheel 2, and is mounted adjacent to the escapement wheel. Gear 5 drives four-lobed cam 6 at an angular speed of one revolution per second. Likewise, eight-lobed cam 7 is driven at one revolution per second by gear connection to four-lobed cam 6. Solenoids 8 and 9 are mounted adjacent to cams 6 and 7 and escapement pins 10 and 11 having cam followers 12 and 13 are operatively associated with cams 6 and 7 and escapement wheel 2. Single frame hold switch 14 is mounted adjacent to solenoid 3 and is operated by movement of escapement pin 4. Escapement wheel 2 is integral with driven gear 17 shown in detail in Fig. 3. Driven gear 17 is connected rigidly to clutch member 18 which is normally driven by driving gear 1 by friction along surface 19, but which can be halted in rotative movement by interposition of one of the escapement pins in the path of the teeth of escapement wheel 2. Driven gear 17 in turn drives gear 20, to which film drive spool 21 is attached. Gear 20 also drives shutter 22 through gears 23, 24, and 25. Gear 5 is driven by driving gear 1 through gears 26 and 27.

Referring to Figs. 4 and 1, remote control operation of the device is accomplished by selective energization of solenoids 3, 8, or 9 from battery 34 or any other suitable source of electrical energy. If single frame operation of the camera is required—in other words, if it is desired to take but a single picture with the camera—solenoid 3 is energized by the closing of switches 28 and 29, shown schematically in Fig. 4, thus pulling escapement pin 4 from its locking position in connection with escapement wheel 2, and allowing movement of escapement wheel 2 from one tooth position to the next tooth position. As escapement pin 4 moves, it actuates single frame hold switch 14, energizes holding solenoid 30, opening the circuit of solenoid 3 and causing escapement pin 4 to reposition itself to prevent further rotative movement of escapement wheel 2. It is to be understood throughout this discussion that escapement wheel 2 is being urged at constant speed to rotate in conjunction with clutch member 18 which connects it to driving gear 1. Switch 29 is the main power switch for motor 33 and must be closed for operation of the camera at four, eight, and sixteen frames per second, as well as for single frame operation. When switch 29, which was closed to energize solenoid 3, is again opened single frame hold switch 14 is also opened and switch 29 may again be closed to take another single frame.

If it is desired to take pictures at the reduced rate of four frames per second, solenoid 9 is energized by the closing of switch 31. Energization of this solenoid causes longitudinal movement of escapement pin 11 against the action of compression spring 15, forcing cam follower 13 against cam 6, and bringing the end of escapement pin 11 into engagement with a tooth of escapement wheel 2. However, since cam 6 is rotating at a constant speed of one revolution per second, escapement pin 11 is removed from its interfering position with respect to escapement wheel 2 four times per second by the action of the raised portions of cam 6. Since the various teeth on escapement wheel 2 are spaced so as to correspond with the distance traveled by the drive mechanism of the camera necessary for the taking of a single frame or picture, the rate of the camera is thus established at four frames per second. As long as solenoid 9 is energized the camera takes pictures at the rate of four frames per second. When solenoid 9 ceases to be remotely energized, the expansion of spring 15 removes escapement pin 11 from the path of escapement wheel 2 and the pin does not thereafter affect the motion of the camera.

Likewise, if it is desired that the camera take eight frames per second, solenoid 8 is energized by closing switch 32, and escapement pin 10 is moved longitudinally against compression spring 16 for engagement with cam 7 which has eight risers equally spaced around its periphery and which, like cam 6, rotates at one revolution per second. Energization of solenoid 8 therefore causes the intermittent motion of the camera drive mechanism at the rate of eight frames per second.

To achieve standard operation of sixteen frames per second, none of the foregoing solenoids are energized but the friction clutch is allowed to drive escapement wheel 2 and the associated mechanism at the full normal rate, which has been established at sixteen frames per second by judicious selection of gear ratios and physical constants. It is to be noted that escapement wheel 2 is the driven member of the clutch between it and driving gear 1 and that, without the interposition of any of the various escapement pins, the operation of the camera drive is at a rate which corresponds to sixteen frames per second. The interposition of the various escapement pins into the path of the teeth of escapement wheel 2 does not alter the rate of travel of the drive mechanism or of the camera, but merely causes it to be interrupted or intermittent.

Therefore, the same optical exposure constants can be employed in connection with the lens of the camera for all the various speeds attained because the speed of shutter 22 and film spool 21, as controlled by the drive mechanism, is at all times constant whether a single frame is taken or whether the device is operated continuously at four, eight, or sixteen frames per second. Complete remote control is achieved by arrangement of switches 28, 29, 31, and 32 and, since the cams which drive rate solenoids 8 and 9 are driven from the same constant speed motor 33 that is used to drive driving gear 1 of the driving mechanism, variations in speed of the motor do not cause timing variations in the camera. The arrangement of escapement wheel and escapement pins is positive and foolproof in operation, and can be trusted to operate for long periods by remote control.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for driving a flight test data recording camera at variable speed without changing the lens aperture thereof comprising a driving member rotated at constant speed, a driven member drivingly connected to the shutter and film feed mechanism of said camera and having an escapement wheel with a plurality of predeterminately spaced peripheral teeth, clutch means between said driving and driven members adapted to cause said two members to rotate together under normal loads and adapted to slip when said driven member is predeterminately restrained, a plurality of face cams having a predetermined number of risers and driven at predetermined constant speed by said driving member, a plurality of solenoid operated escapement pins having cam followers adapted to ride on said cams when said solenoids are energized and so spaced around said escapement wheel as to permit selective intermittent blocking of said wheel by said pins by selective energization of said solenoids to thereby vary the driving speed of said camera without changing the aperture setting thereof.

2. Means for driving a movie camera having a shutter and film feed mechanism at a predetermined number of frames per second without varying the lens opening thereof comprising a driving member rotated at constant speed and a driven member drivingly connected to said shutter and film feed mechanism and having an escapement wheel with a plurality of predeterminately spaced peripheral teeth, clutch means between said driving and driven members adapted to cause said two members to rotate together under normal loads and adapted to slip when said driven member is predeterminately restrained, a solenoid-operated escapement pin adapted to interfere with the motion of said escapement wheel teeth except when said solenoid is energized, a plurality of face cams having a predetermined number of risers and driven at predetermined constant speed by said driving member, a plurality of solenoid-operated escapement pins having cam followers adapted to ride on said cams when said solenoids are energized and so spaced around said escapement wheel as to permit selective intermittent blocking of said wheel by said pins when said solenoids are selectively energized to thereby vary the driving speed of said camera without changing the lens aperture thereof.

DE VER K. WARNER.
DWIGHT R. MARTIN.
ERNEST L. BELLOWS.

REFERENCES CITED

The following references are of record in the file of this patent:

UNITED STATES PATENTS

| Number | Name | Date |
|---|---|---|
| 1,253,285 | Selig | Jan. 15, 1918 |
| 1,759,630 | Rinaldy | May 20, 1930 |
| 1,794,499 | Rosenberger | Mar. 3, 1931 |
| 2,353,154 | Fowler | July 11, 1944 |
| 2,466,668 | Tuttle et al. | Aug. 10, 1948 |

FOREIGN PATENTS

| Number | Country | Date |
|---|---|---|
| 232,625 | Switzerland | June 15, 1944 |